United States Patent [19]
Roba

[11] Patent Number: 4,921,516
[45] Date of Patent: May 1, 1990

[54] METHOD OF MANUFACTURING OPTICAL FIBERS WITH ELIMINATION OF PARAXIAL REFRACTIVE-INDEX DIP

[75] Inventor: Giacomo Roba, Genova-Cogoleto, Italy

[73] Assignee: Cselt-Centro Studi E Laboratori Telecommunicazioni S.p.A., Turin, Italy

[21] Appl. No.: 744,651

[22] Filed: Jun. 13, 1985

Related U.S. Application Data

[63] Continuation of Ser. No. 562,466, Dec. 16, 1983, abandoned.

[30] Foreign Application Priority Data

Dec. 16, 1982 [IT] Italy .................. 68476 A/82

[51] Int. Cl.$^5$ .................................. C03B 37/018
[52] U.S. Cl. .................................. 65/3.12; 65/18.2; 65/29
[58] Field of Search .......... 65/3.12, 3.2, 18.1, 65/18.2, 29, 144; 427/163

[56] References Cited

U.S. PATENT DOCUMENTS

| | | | |
|---|---|---|---|
| 3,961,926 | 6/1976 | Asam | 427/163 |
| 4,304,581 | 12/1981 | Saifi | 65/3.12 |
| 4,341,441 | 7/1982 | Lighty et al. | 427/163 |
| 4,389,230 | 6/1983 | Modone et al. | 427/163 |

FOREIGN PATENT DOCUMENTS

| | | | |
|---|---|---|---|
| 108445 | 9/1978 | Japan | 65/3.12 |
| 78804 | 6/1981 | Japan | 65/3.12 |
| 1047136 | 11/1981 | Japan | 65/3.12 |

OTHER PUBLICATIONS

Akamatsu et al., "Fabrication of Graded-Index Fibers Without an Index Dip by CVD Method", Applied Physics Letters, vol. 31, No. 8, Oct. 15, 1977, pp. 515-517.
Wood et al., "Chemistry of the MCVD Process for Making Optical Fibers: 7th European Conference on Optical Communication", pp. 1.2-1-1.2-4, 9/81.

*Primary Examiner*—Kenneth M. Schor
*Attorney, Agent, or Firm*—Herbert Dubno

[57] ABSTRACT

In producing a preform for an optical fiber by MCVD technology, involving the buildup of a core matrix of doped silica layers inside a glass tube with subsequent thermal collapse of the structure, a layer of dopant is deposited on the inner surface of the finished core matrix before the collapse. The thickness of this dopant layer, which advantageously is in a colloidal state, progressively diminishes along the tube axis in a direction away from an end of the tube at which the collapse begins. The law of thickness variation is chosen to maintain an internal gas pressure of vaporized dopant equal to the vapor pressure of the dopant in the core material at the collapsing temperature, in order to prevent the appearance of a paraxial dip in the refractive-index profile of an optical fiber subsequently drawn from the collapsed preform.

4 Claims, 1 Drawing Sheet

METHOD OF MANUFACTURING OPTICAL FIBERS WITH ELIMINATION OF PARAXIAL REFRACTIVE-INDEX DIP

This is a continuation of co-pending application Ser. No. 562,466 filed on 16 December 1982.

FIELD OF THE INVENTION

My present invention relates to a method of manufacturing an optical fiber by the so-called MCVD (modified chemical-vapor deposition) process involving the production of a preform of selected refractive-index profile from which a fiber of corresponding profile can be drawn.

BACKGROUND OF THE INVENTION

With MCVD technology, a core matrix of doped silica is built up layer by layer on the inner surface of a supporting tube of silica glass, the tube being spacedly surrounded by an axially movable annular heater or ring furnace as described, for example, in commonly owned U.S. Pat. No. 4,389,230. The furnace, which may be operating at a reaction temperature of at least 500° C., is slowly reciprocated along the tube which is being rotated about its axis while a flow of reactants is passed therethrough to form the core matrix; the latter may have a thickness between 10 and 50$\mu$. The process is particularly suitable for glasses of high silica content and enables the production of fibers with very low attenuation of the luminous energy transmitted therethrough. For single-mode fibers the core can be made of silica $SiO_2$ admixed with germanium dioxide $GeO_2$ as a dopant, with or without the further addition of phosphorus pentoxide $P_2O_5$. The attenuation coefficient of a fiber of this character varies between about 0.2 and 0.15 db/Km within a wavelength range of 1.5 to 1.6$\mu$, referred to in the art as the third transmission window.

Once the deposition of the core matrix is completed, the resulting structure is collapsed on its axis by heating to a predetermined higher temperature. The collapse generally takes place from one end of the tube to the other, with progressive displacement of the furnace—now operating at this high temperature—to heat successive zones of the tube. The collapsing end of the core matrix assumes a concave shape to form a meniscus advancing codirectionally with the furnace until the core is completely solidified. The resulting preform is a transparent cylindrical rod with a diameter between about 10 and 30 mm; the fiber subsequently drawn therefrom, in which the supporting tube forms the cladding or sheath, may be about 125$\mu$ in diameter.

During the deposition of the core matrix as well as during the collapsing step, the dopant or dopants of the core material undergo both diffusion and evaporation, the latter particularly from the innermost layer or layers. Since the volatility of the dopants increases with temperature, such evaporation is especially intense just before the collapse and results in a paraxial dip of the refractive-index profile which is typical of fibers produced by the MCVD process. This dip in the vicinity of the axis restricts the bandwidth of multimode fibers but is even more disadvantageous with single-mode fibers whose core diameter is smaller for the transmission of a given wavelength and whose preform, therefore, has a higher ratio of inner to outer core diameter prior to collapse. The dip impairs the propagation and guidance properties of the fiber and increases losses due to a phenomenon termed microbending, compared with those of similar fibers produced by other techniques such as those known as outside vapor deposition (OVD) or vapor axial deposition (VAD).

Nevertheless, the MCVD process is often preferred since it affords greater flexibility in the choice of dopants and in the realization of selected refractive-index profiles; thus, for example, this technique enables realization of a jacket of lower refractive index, termed "depressed cladding", as well as of W-type and triangular profiles designed to shift the minimum dispersion into the spectral zone in which the silica has the lowest optical attenuation.

Various methods have already been proposed for reducing the paraxial refractive-index dip in the preform. Some of these methods involve a chemical attack upon the deposited silica inside the tube before or shortly after the start of the collapse. This expedient is only partly successful and encumbers the production by an additional process step. It has also been suggested to counteract the dip by excessively doping the innermost layers of the core or by letting the preform collapse into a flow of pure dopant. These operations, too, yield only partial results and are not readily reproducible. Furthermore, the flow of dopant through the preform cannot be maintained after one end is blocked by the beginning collapse so that the additional dopant blown into the core matrix necessarily concentrates on its remaining inner surface from which it again partly evaporates as the temperature increases.

OBJECT OF THE INVENTION

Thus, the object of my present invention is to provide an improved method of manufacturing optical fibers by the aforedescribed MCVD technology, with elimination of the paraxial refractive-index dip referred to, which obviates the drawbacks of these prior proposals and neither requires the use of supplemental devices nor significantly lengthens the duration of the process of making the preform.

SUMMARY OF THE INVENTION

I realize this object, in accordance with my present invention, by generating inside the core matrix about to collapse—ahead of the advancing meniscus—an internal gas pressure of the dopant or dopants employed which substantially balances the vapor pressure of the same dopant or dopants in the core material at the high annealing temperature promoting the collapse. This virtually prevents the evaporation of dopant already deposited and thus eliminates the dip in the refractive-index profile of the preform and of the fiber subsequently drawn therefrom.

In principle, the balancing gas pressure could be generated by applying dopant vapor under such pressure to the uncollapsed end of the tube or to an inserted conduit progressively withdrawn at the speed of the advancing meniscus. I prefer, however, to create that balancing pressure by a preliminary deposition—prior to the beginning collapse and at a reaction temperature lower than that inducing the collapse—of a dopant layer on the inner surface of the core matrix which is subsequently and intentionally volatilized by the approaching meniscus. This dopant layer, however, should not be initially of constant thickness since the resulting vapors will tend to escape toward the uncollapsed end of the tube and would therefore progressively accumulate in the uncollapsed part of the preform, thereby enriching the concentration of dopant in the innermost core layers. Thus, I obtain the desired pressure balance by progressively diminishing the initial thickness of the dopant layer in the direction of meniscus advance.

I have further found, in accordance with another feature of my present invention, that any risk of absorption of additional dopant from the deposited layer into the core material can be substantially obviated by giving that layer a porous structure minimizing its area of contact with the core material. For this purpose the dopant is to be deposited at a temperature low enough to convert it to a colloidal state. In any event, the desired thickness variation can be brought about by altering the flow rate of the reactants as the furnace moves along the tube axis to cause their interaction and precipitation; alternatively, the composition of the flow may be kept constant while the axial speed of the furnace is progressively modified. Naturally, a combination of these two modes is also possible.

BRIEF DESCRIPTION OF THE DRAWING

The above and other features of my invention will now be described in detail with reference to the accompanying drawing in which.

SPECIFIC DESCRIPTION

Figure 1:
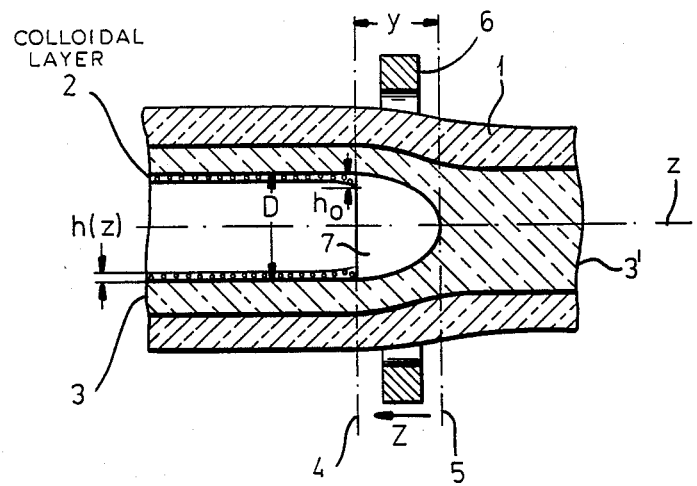
FIG. 1 is an axial sectional view of part of a preform in a partial state of collapse, the core matrix of the preform being provided with an internal dopant layer in accordance with my invention.

FIG. 1 shows part of a preform comprising a vitreous supporting tube 1 of silica glass that has been provided, by an MCVD process, with a core matrix in the form of an internal coating 3 of doped silica which after collapsing forms a solid core 3'. The collapse is promoted by a ring furnace 6 sliding along the axis $z$ of the tube in the direction of an arrow Z, i.e. from right to left as viewed in FIG. 1. At the point of collapse there is formed a meniscus 7 bounded by lines 4 and 5 whose separation $y$ represents the axial depth of the meniscus. The inner diameter of core matrix 3 before collapse is shown at D.

In accordance with my present invention, a colloidal layer 2 of doping material has been deposited on the entire inner surface of core matrix 3 before the beginning of collapse. Layer 2 has a thickness $h(z)$ varying along the axis, i.e. progressively diminishing with increasing axial distance z from the right-hand end of the tube at which the collapse has been started. In the zone of meniscus 7 the layer 2 has been volatilized to create an internal vapor pressure of dopant, such as $GeO_2$ with the possible addition of $P_2O_5$, counterbalancing the vapor pressure of the same doping material incorporated in the core matrix 3.

The layer thickness $h(z)$ is to be so chosen as to vary the mass concentration of the dopant along the axis in a manner maintaining a constant internal gas pressure of dopant vapors in the region of the meniscus 7, taking into consideration the continuous leftward advance of the meniscus driving these vapors before it. The vaporized dopant is partly redeposited on the residual layer 2 to the left of line 4 and the rate of this redeposition should be such as to maintain a constant layer thickness $h_0$ just ahead of the meniscus. The value $h_0$ represents the initial layer thickness at the right-hand end at the preform which is determined by the amount of mass $m^*$ whose evaporation generates the requisite internal pressure equaling the vapor pressure of the dopant at the collapsing temperature. Thus, the preservation of the proper absorption/evaporation equilibrium requires a knowledge of the redeposition function based on the law of deposition of dopant from a reactant flow. This function, however, is further determined by the geometry of the meniscus and, as I have found, gives rise to approximately the following formula for thickness $h(z)$ based upon the focusing effect of the reflecting surface of the meniscus:

$$h(z) = h_0/2\pi[\pi(1 - Z/\pi D \cdot k \cdot K) + 2 \arctan D/2z] \qquad (1)$$

Figure 2:
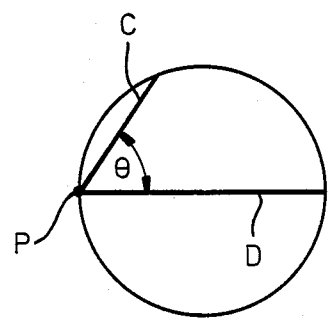
FIG. 2 is a diagram of the inner cross-section of the core matrix, drawn to a larger scale as an aid in the interpretation of a formula for the initial layer thickness.

In the foregoing formula, parameters $\underline{k}$, K and $h_0$ are defined by $$k = D \cdot (z^2 + D^2)^{-\frac{1}{2}} \qquad (2)$$

$$K = (1 - k^2 \sin^2 \theta)^{-\frac{1}{2}} d\theta \qquad (3)$$

$$h_0 = (1/\pi \rho D) \cdot m^*/y \qquad (4)$$

wherein y, z, D and $m^*$ have the significance already referred to, with $m^*$ given by $pV/RT \cdot M$, $\underline{p}$ being the vapor pressure of the dopant in the state of collapse, V being the volume encompassed by meniscus 7, R being the universal gas constant, T being the absolute value (in degrees Kelvin) of the collapsing or annealing temperature and M being the molar mass of the dopant. Parameter $\rho$ is the density of the dopant deposited as layer 2. Parameter $\theta$ is an angle included between a given diameter D and a chord C of the inner cross-section of core matrix 3 before collapse, as illustrated in FIG. 2, the chord extending from a point P at an end of diameter D and varying in length as angle $\theta$ changes from zero to 90°.

As the collapse of the preform progresses, the shrinking residual layer 2 maintains the vapor pressure in the zone of meniscus 7 until solidification is completed.

The annealing temperature is determined by the viscosity $\eta$ of the vitreous material whose natural logarithm, in this instance, is about 13.

I claim:
1. A method of producing a preform for an optical fiber to be drawn therefrom, comprising the steps of:
   (a) building up a tubular core matrix of selected refractive-index profile by vapor deposition of silica and a dopant on the inner surface of a supporting tube of silica glass;
   (b) thereafter and upon completion of the buildup of the core matrix, applying thereto a layer consisting essentially and substantially exclusively of said dopant at a reaction temperature, said reaction temperature being lower than a predetermined collapsing temperature, to generate upon subsequent evaporation an internal gas pressure of said dopant substantially balancing the vapor pressure of the dopant upon collapse of said tube and heating of said core matrix to prevent the formation of a paraxial dip in the refractive-index profile of the fiber to be drawn by evaporation of said layer of said dopant preformed upon said core matrix;
   (c) varying the thickness of said dopant layer during the application thereof to said core matrix by a progressive change in a flow of vaporized reactants from which the dopant layer is deposited at said reaction temperature, wherein the thickness $h(z)$ of said dopant layer is a function of distance along the axis varying according to the formula $$h(z) = \frac{h_0}{2\pi}\left\{\pi \cdot \left[1 - \frac{z}{\pi D} \cdot k \cdot K(k)\right] + 2\text{arctg}\frac{D}{2z}\right\}$$

wherein $$k = D \cdot (z^2 + D^2)^{-\frac{1}{2}}$$

$$K(k) = \int_0^{\pi/2} (1 - k^2 \sin^2\theta)^{-\frac{1}{2}} d\theta$$

$$h_0 = \frac{1}{\pi\rho D} \frac{m^*}{y}$$

m* is the mass needed to generate the balancing gas pressure given by pV/RT·M where p is the vapor pressure of the dopant in a state of collapse of the preform caused by said predetermined collapsing temperature, V is the volume encompassed by an internal meniscus formed during collapse of the preform, R is the universal gas constant, T is absolute value of said collapsing temperature and M is the molar mass of the dopant, y is the axial depth of the meniscus, z is the axial distance from said one end, $\rho$ is the density of the deposited dopant, D is the diameter of the inner surface of the core matrix before collapse, and $\theta$ is an angle included between a given diameter of the inner cross-section of the core matrix and a chord of said inner cross-section extending from an end of said diameter; and (d) subjecting said tube to a progressive collapse on an axis of said tube by exposing successive zones thereof from one end to the other to said predetermined collapsing temperature, thereby giving rise to an internal meniscus advancing from said one end along the axis.

2. A method of producing a preform for an optical fiber to be drawn therefrom, comprising the steps of:

(a) building up a tubular core matrix of selected refractive-index profile by vapor deposition of silica and a dopant on the inner surface of a supporting tube of silica glass;

(b) thereafter and upon completion of the buildup of the core matrix, applying thereto a layer consisting essentially and substantially exclusively of said dopant, at a reaction temperature, said reaction temperature being lower than a predetermined collapsing temperature, to generate upon subsequent evaporation an internal gas pressure of said dopant substantially balancing the vapor pressure of the dopant upon collapse of said tube and heating of said core matrix to prevent the formation of a paraxial dip in the refractive-index profile of the fiber to be drawn by evaporation of said layer of said dopant preformed upon said core matrix;

(c) varying the thickness of said dopant layer during the application thereof to the core matrix by progressively changing the axial speed of a source of heat operating at said reaction temperature and moving along the axis during a flow of vaporized reactants from which the dopant layer is deposited, wherein the thickness h(z) of said dopant layer is a function of distance along the axis varying according to the formula $$h(z) = \frac{h_0}{2\pi}\left\{\pi \cdot \left[1 - \frac{z}{\pi D} \cdot k \cdot K(k)\right] + 2\text{arctg}\frac{D}{2z}\right\}$$

wherein $$k = D \cdot (z^2 + D^2)^{-\frac{1}{2}}$$

$$K(k) = \int_0^{\pi/2} (1 - k^2 \sin^2\theta)^{-\frac{1}{2}} d\theta$$

$$h_0 = \frac{1}{\pi\rho D} \frac{m^*}{y}$$

m* is the mass needed to generate the balancing gas pressure given by pV/RT·M where p is the vapor pressure of the dopant in a state of collapse of the preform by exposure to said collapsing temperature, V is the volume encompassed by an internal meniscus formed during collapse of the preform, R is the universal gas constant, T is absolute value of said collapsing temperature and M is the molar mass of the dopant, y is the axial depth of the meniscus, z is the axial distance from said one end, $\rho$ is the density of the deposited dopant, D is the diameter of the inner surface of the core matrix before collapse, and $\theta$ is an angle included between a given diameter of the inner cross-section of the core matrix and a chord of said inner cross-section extending from an end of said diameter; and (d) subjecting said tube to a progressive collapse on an axis of said tube by exposing successive zones thereof from one end to the other to said predetermined collapsing temperature, thereby giving rise to an internal meniscus advancing from said one end along the axis.

3. A method as defined in claim 1, wherein said dopant layer is deposited on the inner surface of the core matrix, at said lower temperature, in a colloidal state with a porous structure.

4. A method as defined in claim 2, wherein said dopant layer is deposited on the inner surface of the core matrix, at said lower temperature, in a colloidal state with a porous structure.

* * * * *